United States Patent
Hanson et al.

(10) Patent No.: US 9,159,967 B1
(45) Date of Patent: Oct. 13, 2015

(54) BATTERY STORAGE AND DISPENSING SYSTEM

(71) Applicants: John Lippert Hanson, Novato, CA (US); John Peter Hanson, Novato, CA (US)

(72) Inventors: John Lippert Hanson, Novato, CA (US); John Peter Hanson, Novato, CA (US)

( * ) Notice: Subject to any disclaimer, the term of this patent is extended or adjusted under 35 U.S.C. 154(b) by 0 days.

(21) Appl. No.: 14/492,407

(22) Filed: Sep. 22, 2014

(51) Int. Cl.
*H01M 2/10* (2006.01)

(52) U.S. Cl.
CPC .......... *H01M 2/1027* (2013.01); *H01M 2/105* (2013.01); *H01M 2/1016* (2013.01); *H01M 2/1022* (2013.01)

(58) Field of Classification Search
CPC .......... H01M 2/1016; H01M 2/1022; H01M 2/1027; H01M 2/105
USPC ............................................. 429/50
See application file for complete search history.

(56) References Cited

U.S. PATENT DOCUMENTS

| | | | |
|---|---|---|---|
| 3,221,930 A | 12/1965 | Nasgowitz | |
| 4,109,980 A | 8/1978 | Brockman | |
| 5,288,119 A * | 2/1994 | Crawford et al. | 294/65.5 |
| 5,670,268 A * | 9/1997 | Mancusi | 429/9 |
| 5,700,075 A * | 12/1997 | Perone | 312/45 |
| 5,833,118 A | 11/1998 | Weiss | |
| 5,855,422 A | 1/1999 | Naef | |
| 6,615,986 B2 | 9/2003 | Pirro | |
| 6,860,400 B2 | 3/2005 | Lampe | |
| 6,902,062 B1 * | 6/2005 | Kumakura et al. | 206/703 |
| 7,036,664 B2 | 5/2006 | Lee | |
| 7,726,711 B1 * | 6/2010 | Steltzer | 294/3 |
| D624,832 S * | 10/2010 | Wendelberger | D9/733 |
| 8,228,024 B1 * | 7/2012 | Zander | 320/107 |
| 2002/0153278 A1 | 10/2002 | Pirro | |

* cited by examiner

*Primary Examiner* — Stewart Fraser
(74) *Attorney, Agent, or Firm* — Neustel Law Offices

(57) ABSTRACT

A battery storage and dispensing system for efficiently storing and dispensing various sizes of batteries. The battery storage and dispensing system generally includes a housing having a plurality of vertical compartments that each receive a type of battery, a door pivotally connected to the housing to selectively enclose the vertical compartments forming a plurality of lower openings for batteries to be removed from the vertical compartments and a removal device having a magnet that magnetically connects to the metal terminal end of a battery to allow for efficient removal of the lowermost battery from a compartment.

20 Claims, 13 Drawing Sheets

BATTERY STORAGE AND DISPENSING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a battery storage device and more specifically it relates to a battery storage and dispensing system for efficiently storing and dispensing various sizes of batteries.

2. Description of the Related Art

Any discussion of the related art throughout the specification should in no way be considered as an admission that such related art is widely known or forms part of common general knowledge in the field.

Electric household batteries are used every day in various electronic devices around a home or office such as remote controls, flashlights, remote controlled vehicles, clocks and the like. There are various types of batteries (e.g. AAA, AA) having different physical sizes and shapes (e.g. cylindrical, rectangular). Examples of conventional household batteries in use today include 9-volt batteries (48.5 mm in length, 26.5 mm in height and 17.5 mm in width), AAA batteries (44.5 mm in length and 10.5 mm in diameter), AA batteries (49.2-50.5 mm in length and 13.5-14.5 mm in diameter), C batteries (50 mm in length and 26.2 mm in diameter), D batteries (61.5 mm in length and 33.2 mm in diameter) and the like. Conventional batteries all have at least one metal terminal (typically a positive terminal at a first end in a button terminal structure and a negative terminal at an opposing second end in a flat terminal structure). Conventional batteries are sold at stores in packages of 1 or more batteries typically with a transparent plastic cover and a cardboard backing that has a slot for removal of the batteries. Consumers typically keep the batteries in the original store packaging and put the same in a drawer.

One problem with conventional batteries is that they are difficult to store, find and retrieve. Another problem with conventional batteries is that newer batteries are often times stored alongside older batteries thereby allowing consumers to retrieve a newer battery when they should be using an older battery. A further problem with conventional batteries is that it is difficult to identify which types of batteries need to be replenished since all of the batteries are comingled with one another. Another problem with conventional batteries is they take up a significant amount of space in a drawer since there is no organization of the batteries. A further problem is finding the specific type of battery needed for an electric device can be difficult.

Because of the inherent problems with the related art, there is a need for a new and improved battery storage and dispensing system for efficiently storing and dispensing various sizes of batteries.

BRIEF SUMMARY OF THE INVENTION

The invention generally relates to a battery storage and dispensing device which includes a housing having a plurality of vertical compartments that each receive a type of battery, a door pivotally connected to the housing to selectively enclose the vertical compartments forming a plurality of lower openings for batteries to be removed from the vertical compartments and a removal device having a magnet that magnetically connects to the metal terminal end of a battery to allow for efficient removal of the lowermost battery from a compartment.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
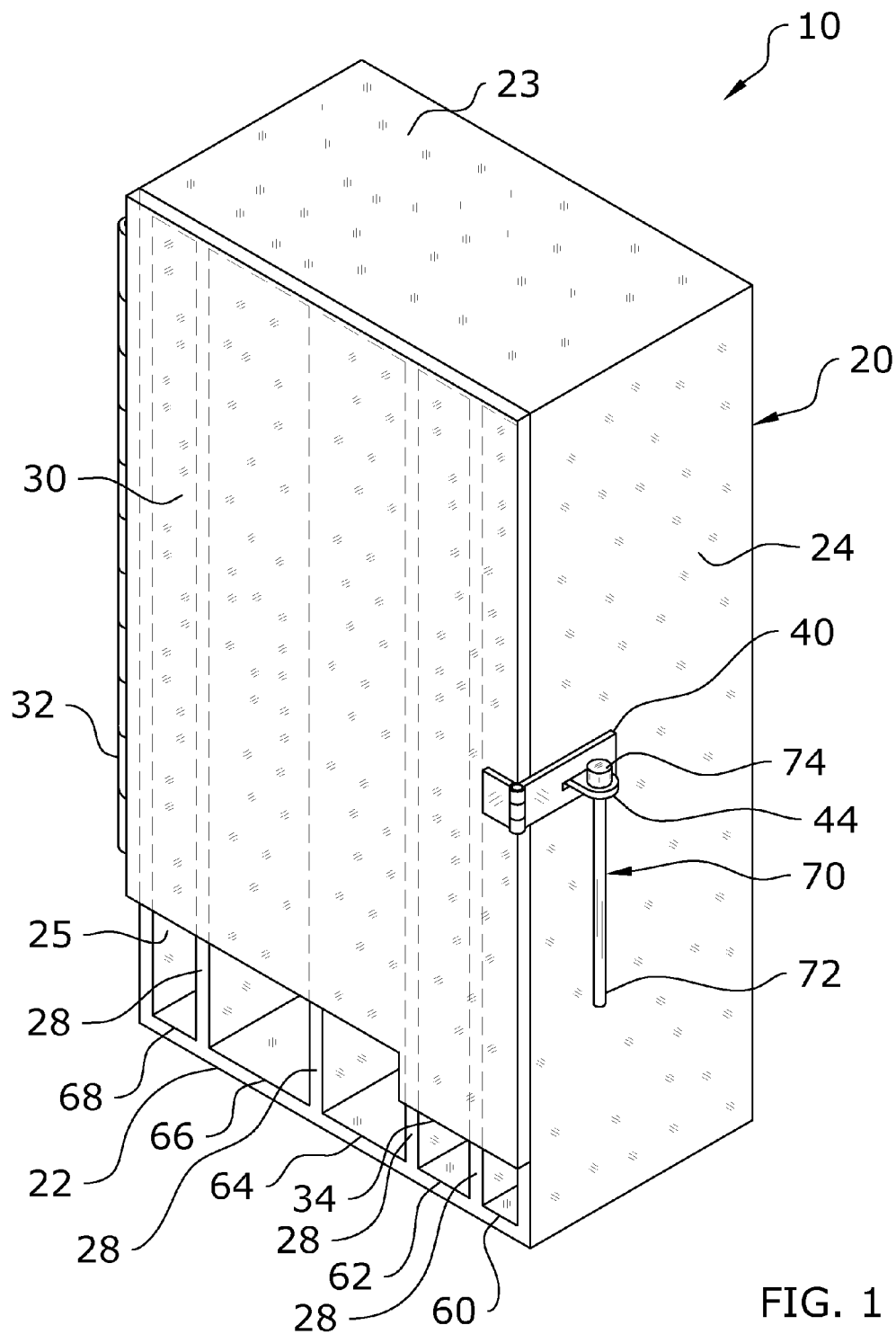
FIG. 1 is an upper perspective view of the present invention with the door closed.

Turning now descriptively to the drawings, in which similar reference characters denote similar elements throughout the several views, FIGS. 1 through 11 illustrate a battery storage and disensing system 10, which comprises a housing 20 having a plurality of vertical compartments that each receive a type of battery, a door 30 pivotally connected to the housing 20 to selectively enclose the vertical compartments forming a plurality of lower openings for batteries to be removed from the vertical compartments and a removal device 70 having a magnet 74 that magnetically connects to the metal terminal end of a battery to allow for efficient removal of the lowermost battery from a compartment.

B. Conventional Batteries

The present invention is designed and adapted to receive various types of conventional electric household batteries that are used in various electronic devices around a home or office such as remote controls, flashlights, remote controlled vehicles, clocks and the like. The present invention is adapted to receive various types, sizes and shapes of batteries including cylindrical shaped batteries and rectangular shaped batteries. Examples of conventional household batteries in use today that are suitable for storage and dispensing from the present invention include 9-volt batteries 19 (48.5 mm in length, 26.5 mm in height and 17.5 mm in width), AAA batteries 12 (44.5 mm in length and 10.5 mm in diameter), AA batteries 14 (49.2-50.5 mm in length and 13.5-14.5 mm in diameter), C batteries 16 (50 mm in length and 26.2 mm in diameter), D batteries 18 (61.5 mm in length and 33.2 mm in diameter) and the like. Conventional batteries all have at least one metal terminal (typically a positive terminal at a first end in a button terminal structure and a negative terminal at an opposing second end in a flat terminal structure).

C. Housing

FIGS. 1 through 7d illustrate the housing 20. The housing 20 preferably is comprised of a rectangular shape but may have various other shapes capable of receiving, storing and dispensing batteries (e.g. a vertically orientated cylindrical structure with the openings 60, 62, 64, 66, 68 in the outer lower portion of the perimeter of the cylindrical structure). The housing 20 is constructed of a rigid material to support the batteries 12, 14, 16, 18, 19 and the housing 20 is further preferably constructed of a transparent (or at least semi-transparent) material such as plastic to allow for the viewing of the current inventory of batteries 12, 14, 16, 18, 19 in the housing 20 to provide a visual indication of what type of batteries 12, 14, 16, 18, 19 need to be replenished and purchased to avoid running out. The housing 20 may be constructed of a non-transparent material also. The housing 20 is adapted to receive, store and dispense conventional consumer batteries having an elongated structure and a longitudinal axis.

Figure 5:
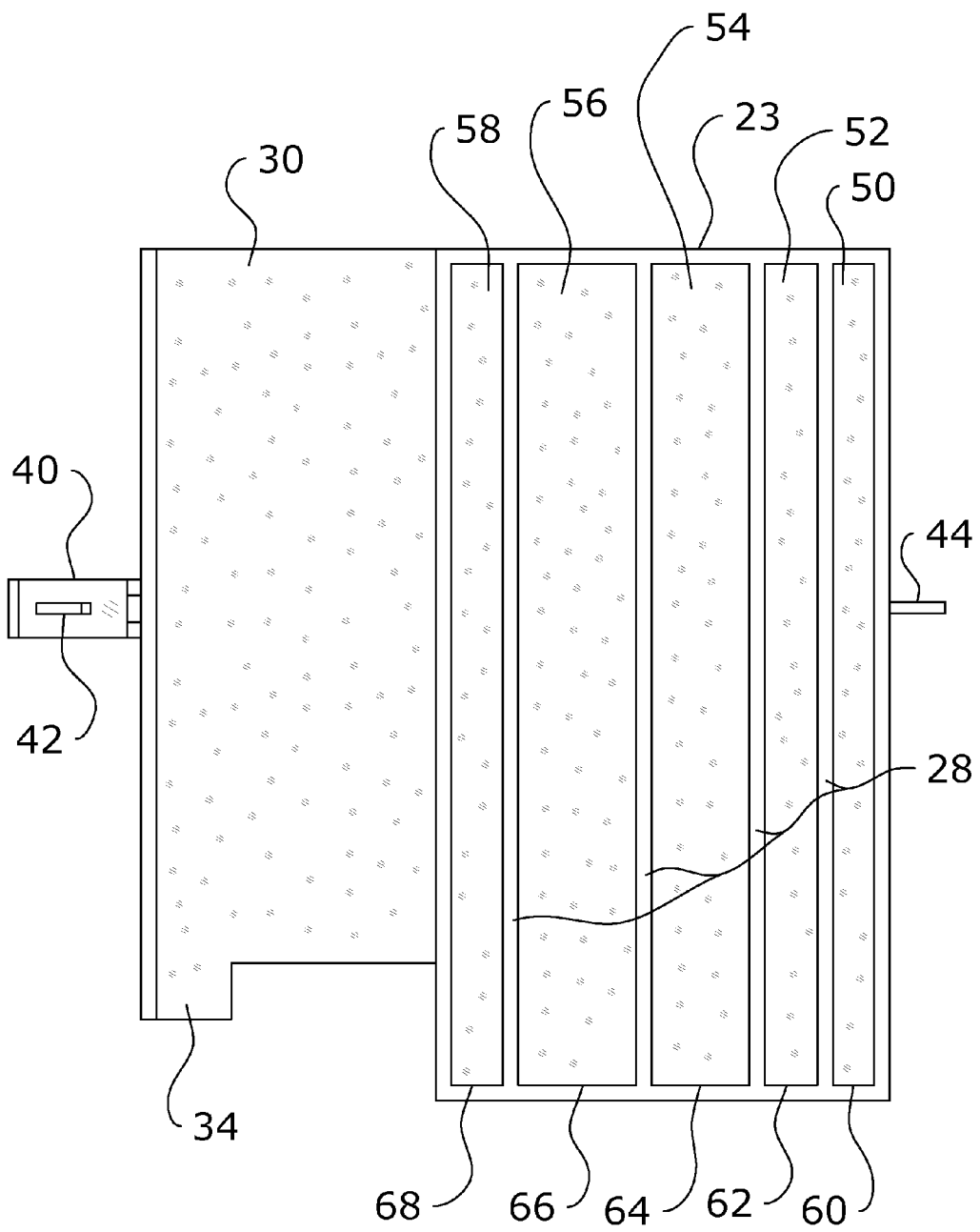
FIG. 5 is a front view of the present invention with the door open.

The housing 20 has at least a first compartment 50 and further preferably includes a plurality of compartments 50, 52, 54, 56, 58. As illustrated in FIG. 5 of the drawings, the compartments 50, 52, 54, 56, 58 are preferably parallel with respect to one another. Each of the compartments 50, 52, 54, 56, 58 preferably is adapted and sized to receive and store a specific type of battery. For example and as shown in FIG. 6 of the drawings, the first compartment 50 may have a size adapted to receive AAA batteries 12, the second compartment 52 may have a size adapted to receive AA batteries 14, the third compartment 54 may have a size adapted to receive C batteries 16, the fourth compartment 56 may have a size adapted to receive D batteries 18, the fifth compartment 58 may have a size adapted to receive 9-volt batteries 19 and so forth.

Each compartment 50, 52, 54, 56, 58 is capable of receiving a battery that is smaller in width and length than the compartment 50, 52, 54, 56, 58. Each of the compartments 50, 52, 54, 56, 58 is adapted and capable of receiving a plurality of corresponding batteries 12, 14, 16, 18, 19 as shown in FIGS. 6 through 7d of the drawings.

Figure 6:
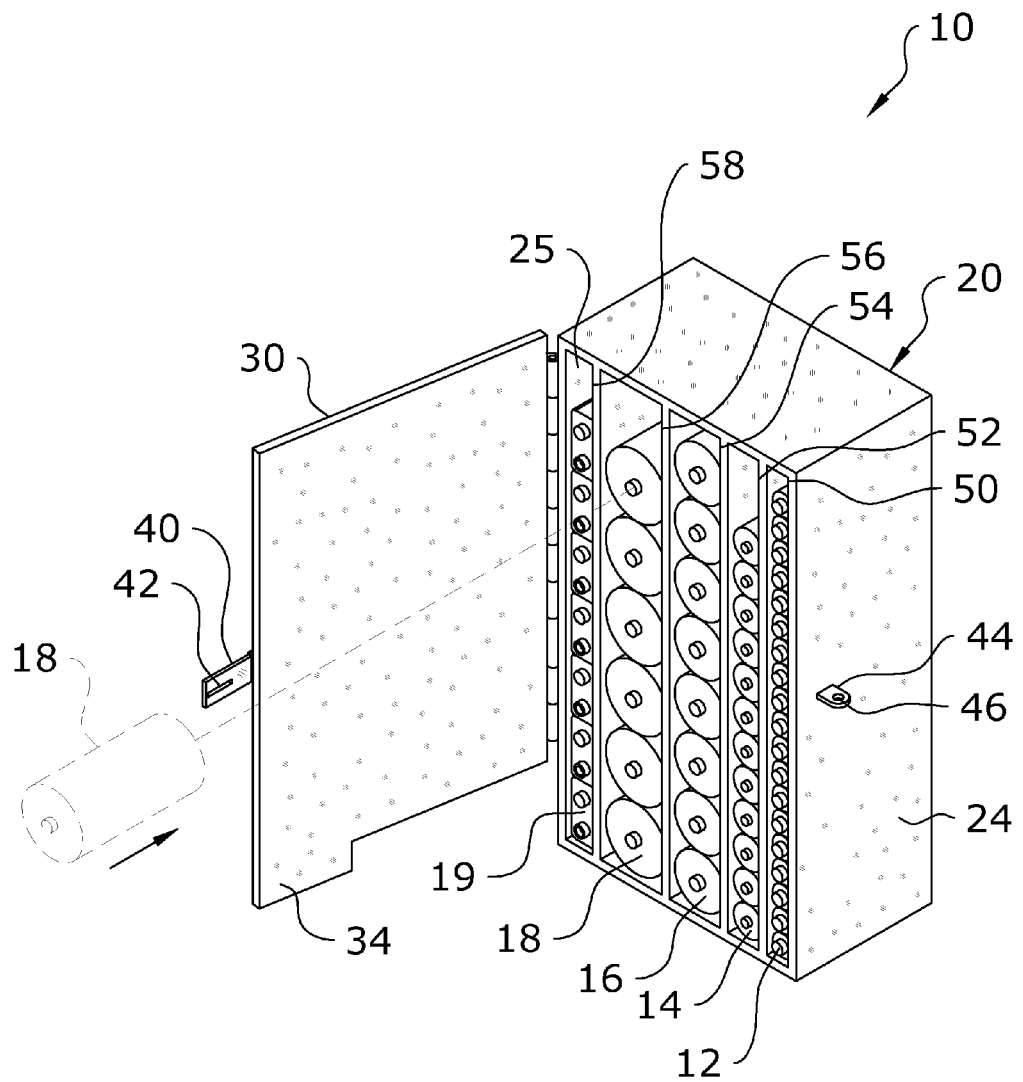
FIG. 6 is an upper perspective view of the present invention being filled with batteries.

The batteries 12, 14, 16, 18, 19 in each of the compartments are preferably adjacent to one another and preferably in a vertical stacked configuration as illustrated in FIG. 6 of the drawings. While the batteries 12, 14, 16, 18, 19 are directly stacked along a vertical axis in FIG. 6, it can be appreciated that the batteries may be vertically stacked in a staggered manner where the width of the corresponding compartment is sufficient to allow for the batteries to be slightly offset with respect to one another.

Figure 10:
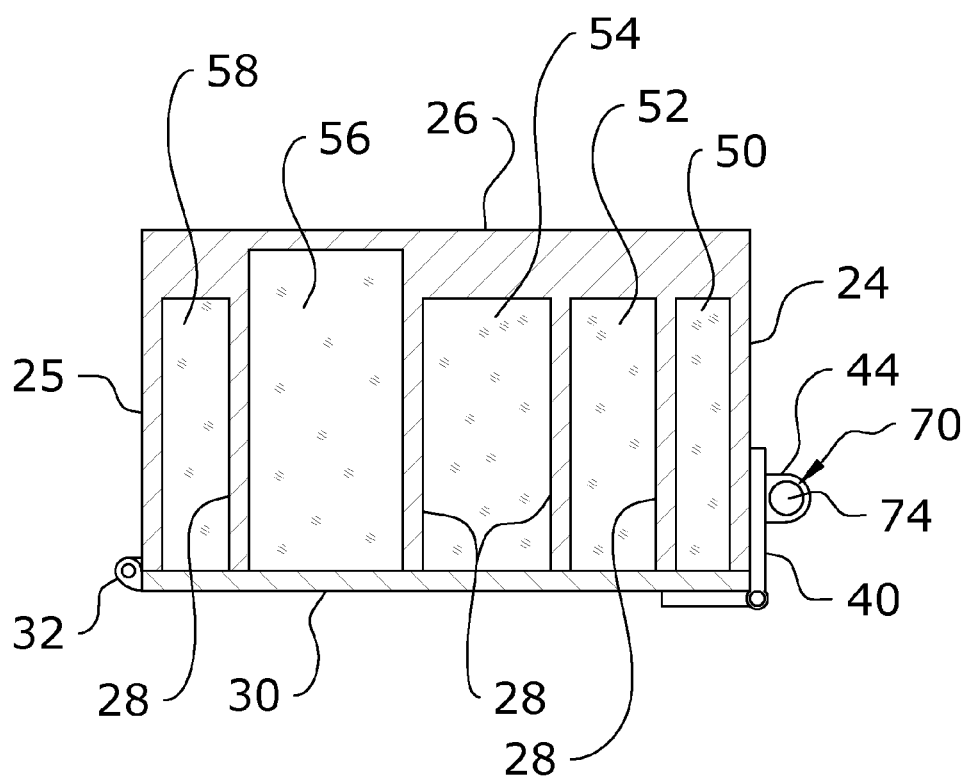
FIG. 10 is a cross sectional view taken along line 10-10 of FIG. 4.

The housing 20 has an interior depth (measured from front to back of the interior space of the housing 20) of at least 44.5 mm to accommodate AAA batteries 12 and larger batteries. The depth of the individual compartments 50, 52, 54, 56, 58 may be the same or different to correspond to the length of the batteries 12, 14, 16, 18, 19 to ensure that the front end of the batteries 12, 14, 16, 18, 19 are near the opening 60, 62, 64, 66, 68 as illustrated in FIG. 10. The first compartment 50 has a first opening 60, the second compartment 52 has a second opening 62, the third compartment 54 has a third opening 64, the fourth compartment 54 has a fourth opening 66 and the fifth compartment 58 has a fifth opening 68. It can be appreciated that the openings 60, 62, 64, 66, 68 are comprised of a single opening or a plurality of openings. The housing 20 preferably has a depth greater than 61.5 mm to accommodate D batteries 18 (along with other types of batteries such as 9-volt batteries 19, AAA batteries 12, AA batteries 14 and C batteries 16 (however, shallower depths may be used if larger sized batteries do not need to be stored in the housing 20).

At least one opening 60, 62, 64, 66, 68 extends into the housing 20 exposing at least one removable battery within each of the compartments 50, 52, 54, 56, 58. It is preferable that the at least one opening 60, 62, 64, 66, 68 is positioned within a lower portion of the housing 20 to allow for the lowermost battery in each of the compartments 50, 52, 54, 56, 58 to be removed when the housing 20 is vertically orientated. The housing 20 may be horizontally orientated as an alternative configuration for the housing 20 with a biasing device (e.g. spring) forcing the batteries 12, 14, 16, 18, 19 towards the at least one opening 60, 62, 64, 66, 68.

Figure 2:
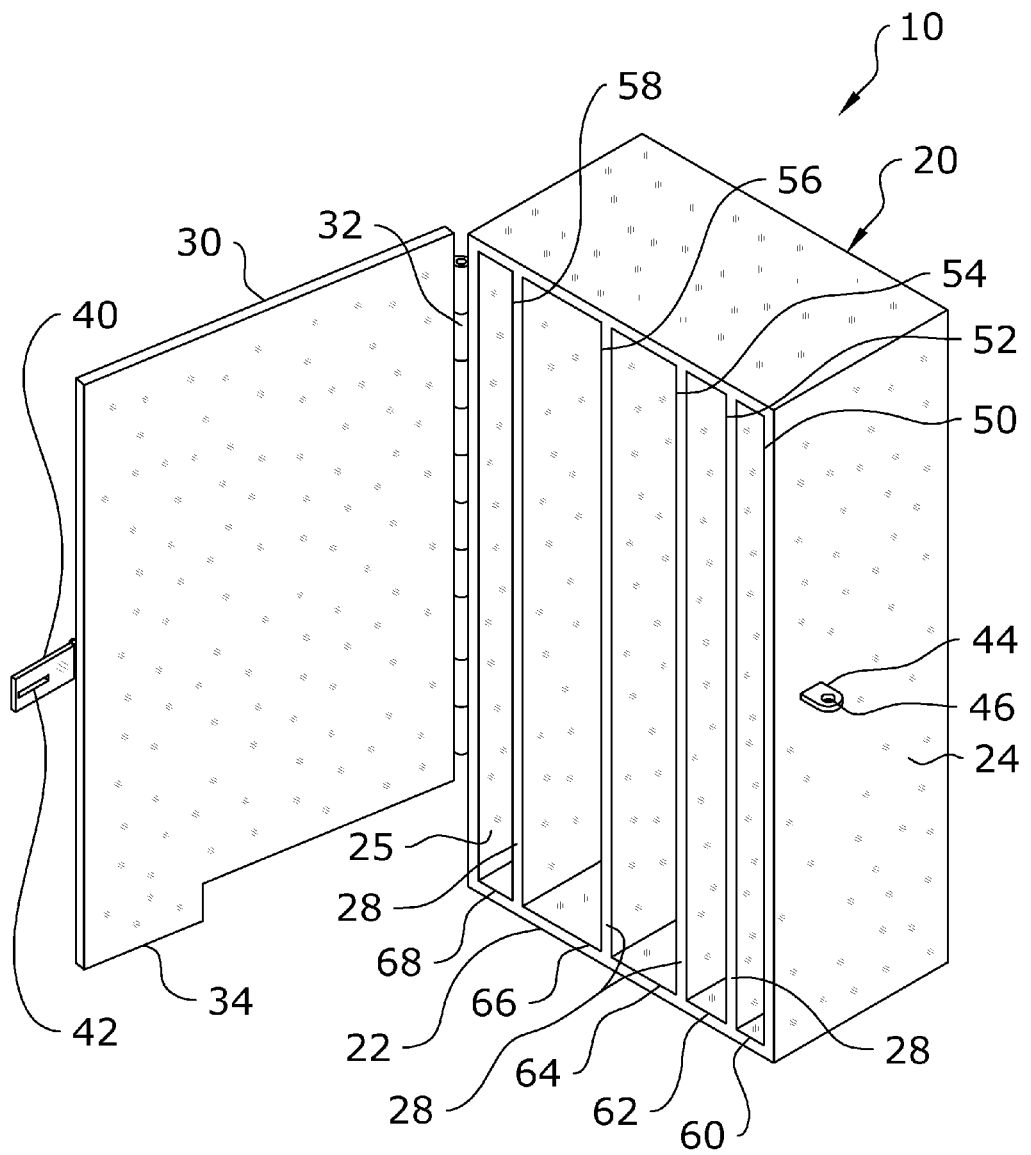
FIG. 2 is an upper perspective view of the present invention with the door open.
Figure 3:
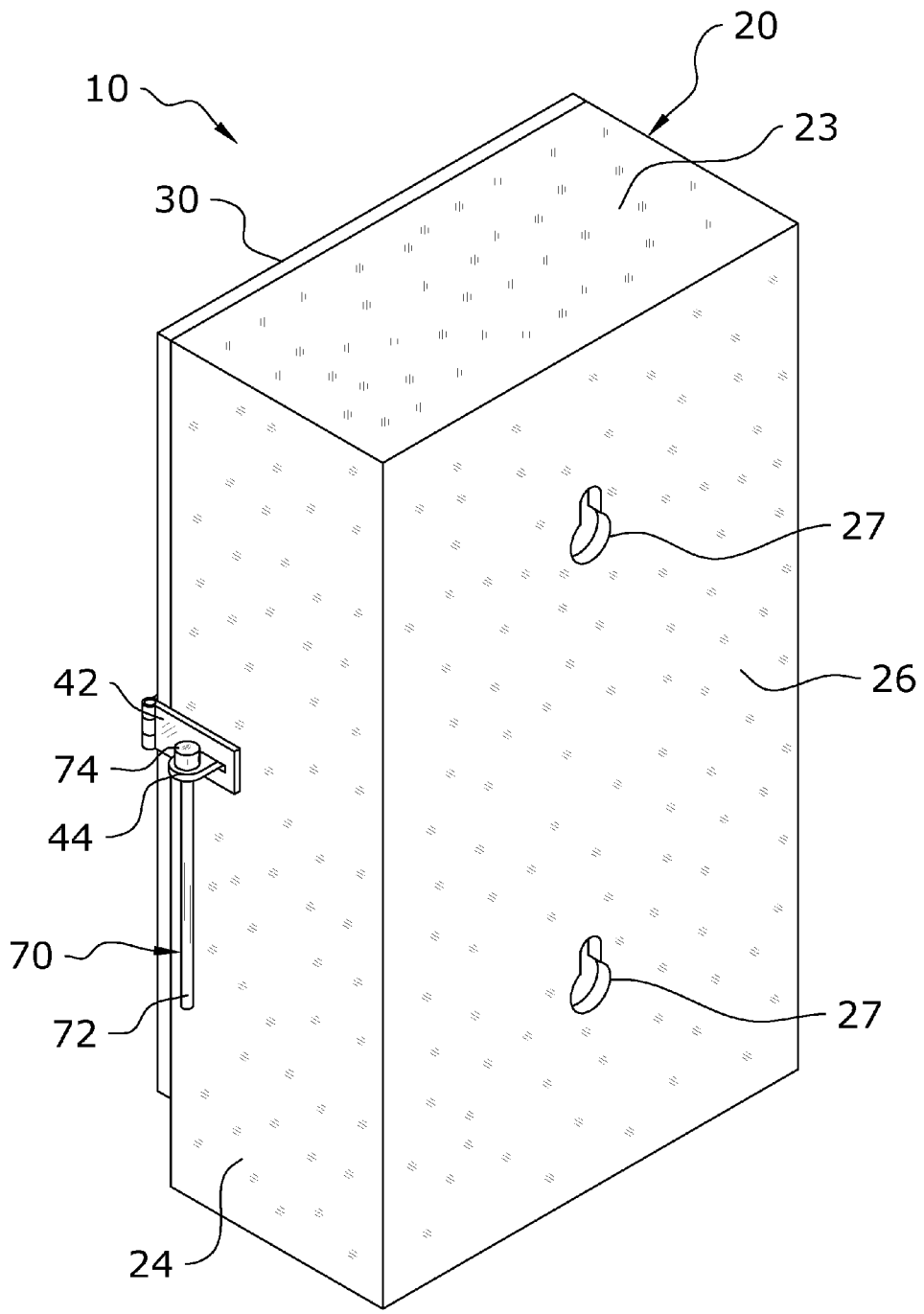
FIG. 3 is a rear upper perspective view of the present invention.
Figure 4:
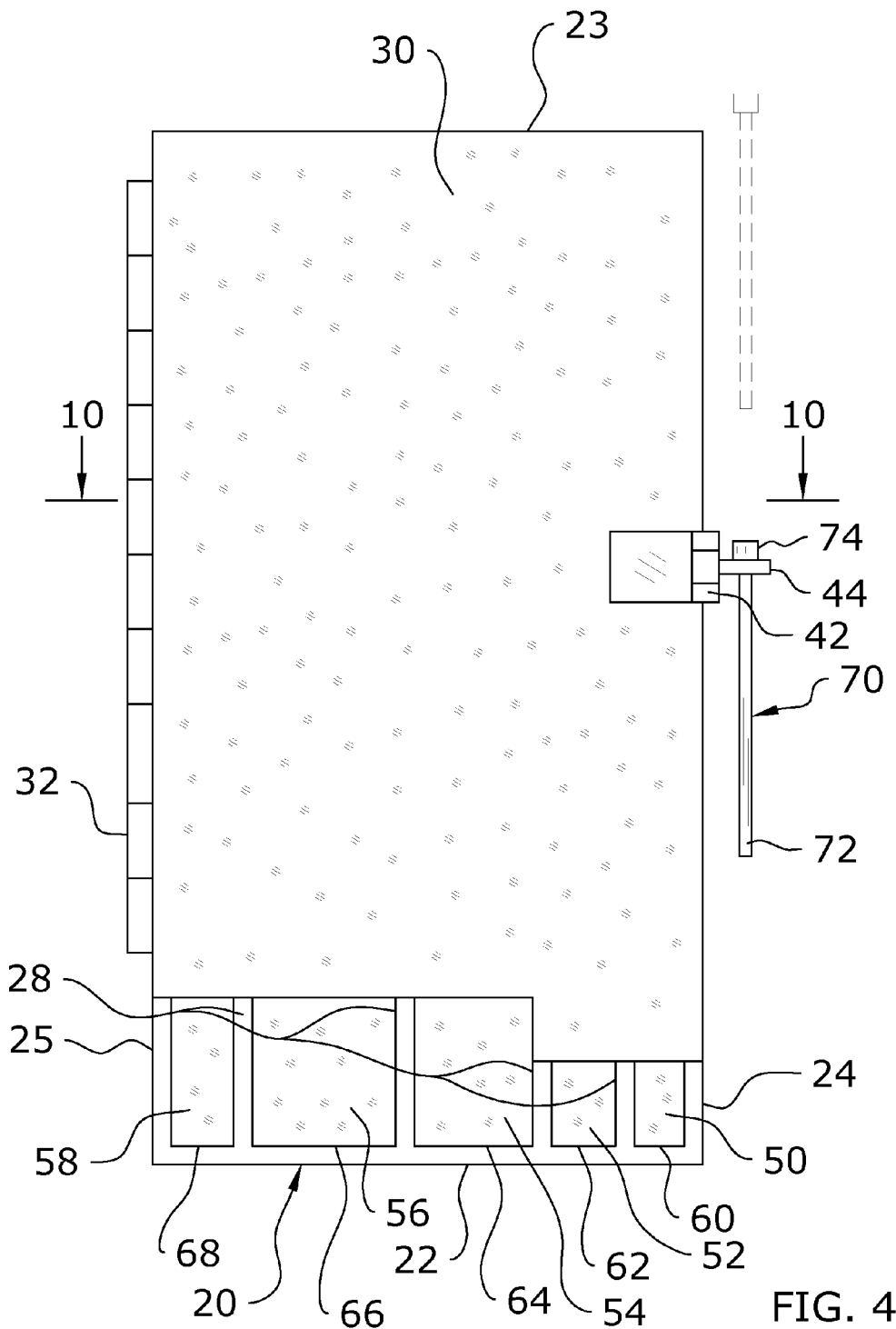
FIG. 4 is a front view of the present invention with the door closed.

The at least one opening 60, 62, 64, 66, 68 is preferably comprised of a single opening formed by the lower edge of a door 30 as illustrated in FIGS. 4 and 6 of the drawings. The at least one opening 60, 62, 64, 66, 68 may be formed by a wall or other structure of the housing 20 other than the door 30. The door 30 is attached to the housing 20 that is adapted to selectively enclose the compartments 50, 52, 54, 56, 58 forming the corresponding openings 60, 62, 64, 66, 68. The door 30 is pivotally attached to the housing 20 by at least one hinge 32 as shown in FIG. 2 of the drawings. The hinge 32 may be comprised of a piano hinge or other type of hinge. The door 30 includes a latch device 40 that is attached to a distal portion of the door 30 that removably connects to an extended member 44 extending outwardly from the housing 20 as shown in FIGS. 1 through 6 of the drawings. The extended member 44 includes a latch aperture 46 that removably receives the removal device 70 to secure the latch device 40 to the extended member 44 and to store the removal device 70 during non-usage as shown in FIGS. 1, 3 and 4 of the drawings.

Figure 7A:
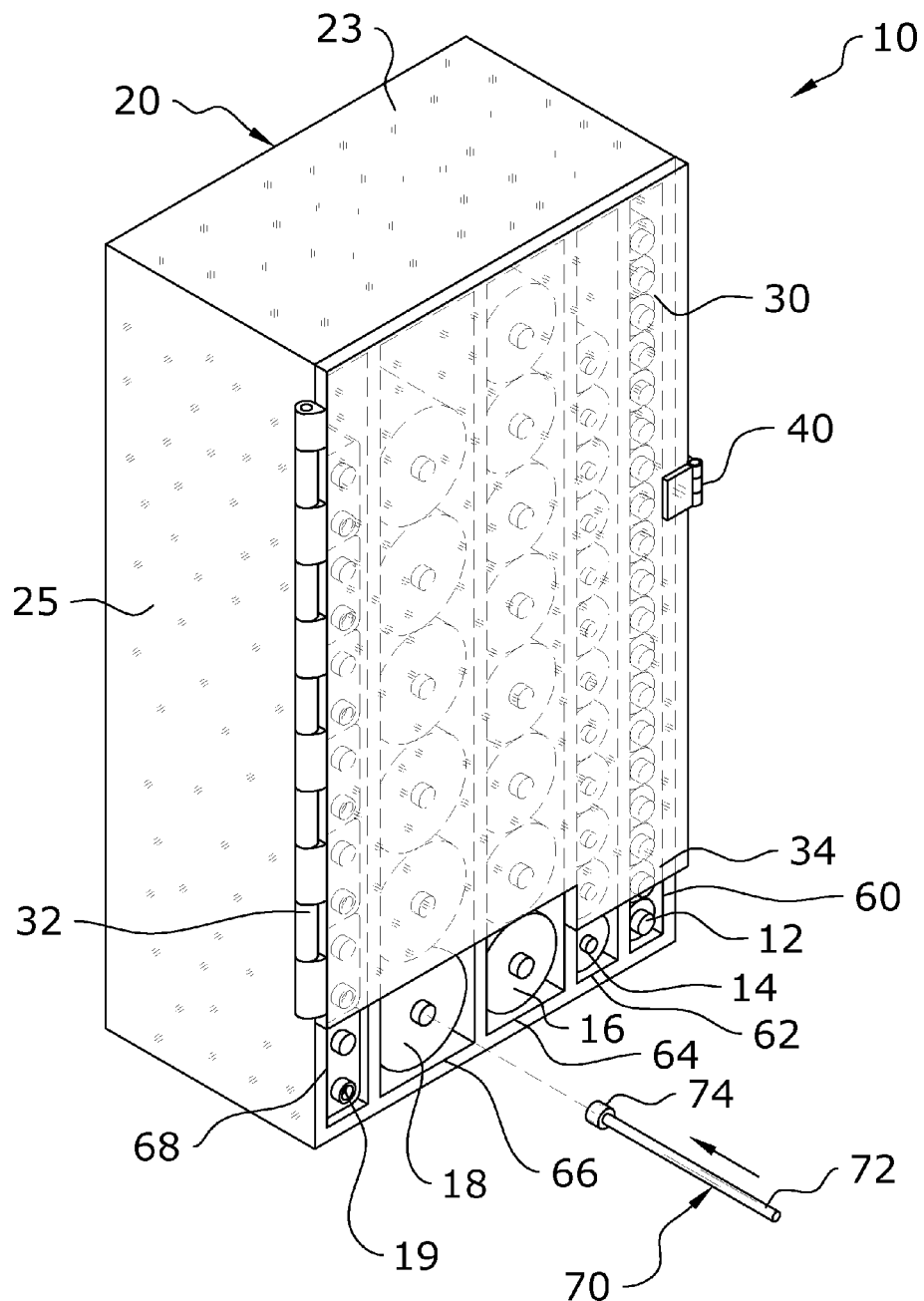
FIG. 7a is an upper perspective view of the present invention storing a plurality of different types of batteries and with the removal device positioned away from a D battery.

The lower edge of the door 30 forms at least one larger opening 64, 66, 68 for the larger sized batteries (e.g. C batteries 16, D batteries 18 and 9-volt batteries 19) and at least one smaller opening 60, 62 for the smaller sized batteries (e.g. AAA batteries 12, AA batteries 14) as shown in FIG. 7a of the drawings. The door 30 preferably includes an extended portion 34 that extends downwardly further than the remaining portion of the lower edge of the door 30 to create the smaller sized openings 60, 62 for the smaller sized batteries.

It can be appreciated that the 9-volt batteries 19 may be stacked with their height stacked in a vertical manner as shown in FIG. 6 or with their width stacked in a vertical manner. The batteries 12, 14, 16, 18, 19 are stacked in the compartments 50, 52, 54, 56, 58 with their electrical terminals (e.g. button terminal or flat end terminal) exposed through the corresponding opening 60, 62, 64, 66, 68 so that the magnet 74 of the removal device 70 may magnetically engage and connect to the electrical terminal.

The housing 20 may include any number of compartments such as 1, 2, 3, 4, 5, 6, 7 or more compartments. The compartments 50, 52, 54, 56, 58 are formed by a plurality of partition members 28 within the housing 20 as shown in FIGS. 2, 5 and 6 of the drawings. The partition members 28 preferably extend from the first end wall 22 to the second end wall 23 of the housing 20 with a first sidewall 24 and a second sidewall 25 attached to the end walls 22, 23 as shown in FIGS. 1 through 6 of the drawings. A rear wall 26 is attached to the end walls 22, 23, the sidewalls 24, 25 and to the partition members 28 to form a plurality of slots that define the compartments 50, 52, 54, 56, 58. The rear wall 26 may include one or more receiver apertures 27 adapted to be receive the broad end of a fastener (e.g. screw, nail) that is attached to a wall of a building structure to mount the housing 20 to the wall. The slots are enclosed at least partially by the door 30 when the door 30 is closed to prevent the accidental discharge of the batteries in the housing 20 as illustrated in FIGS. 1, 4 and 7a of the drawings.

The first compartment 50 in the housing 20 is preferably vertically orientated so that the first removable battery is the lowermost of the plurality of first batteries as shown in FIG. 7a of the drawings. When the first removable battery is removed from the housing 20, a first next battery automatically moves downwardly via gravity to be the lowermost of the plurality of first batteries as shown in FIG. 7d of the drawings. The first compartment 50 preferably has a width greater than 10.5 mm and a depth greater than 44.5 mm to receive AAA batteries 12.

The housing 20 further includes a second compartment 52 adjacent to the first compartment 50 as shown in FIGS. 5 and 6. The second compartment 52 is vertically orientated and is adapted to receive and store a plurality of second batteries. The plurality of second batteries are preferably a different type of battery than the plurality of first batteries (though they may be the same type of battery) wherein a width of the second compartment 52 is different than a width of the other compartments to accommodate the different sized batteries.

The housing 20 further includes a third compartment 54 adjacent to the second compartment 52 as shown in FIGS. 5 and 6. The third compartment 54 is vertically orientated and is adapted to receive and store a plurality of third batteries. The plurality of third batteries are preferably a different type of battery than the plurality of first batteries and the plurality of second batteries (though they could be the same) wherein a width of the third compartment 54 is different than a width of the other compartments to accommodate the different sized batteries.

The housing 20 further includes a fourth compartment 56 adjacent to the third compartment 54 as shown in FIGS. 5 and 6. The fourth compartment 56 is vertically orientated and is adapted to receive and store a plurality of fourth batteries. The plurality of fourth batteries are preferably a different type of battery than the plurality of first, second and third batteries (though they could be the same) wherein a width of the fourth compartment 56 is different than a width of the other compartments to accommodate the different sized batteries.

The housing 20 further includes a fifth compartment 58 adjacent to the fourth compartment 56 as shown in FIGS. 5 and 6. The fifth compartment 58 is vertically orientated and is adapted to receive and store a plurality of fifth batteries. The plurality of fifth batteries are preferably a different type of battery than the plurality of first, second, third and fourth batteries (though they could be the same) wherein a width of the fifth compartment 58 is different than a width of the other compartments to accommodate the different sized batteries.

D. Battery Removal Device

The battery removal device 70 has a magnet 74. The magnet 74 is comprised of a permanent magnet 74 that produces a magnetic field that attracts a battery the opening when the magnet 74 is positioned near the opening 60, 62, 64, 66, 68 to remove the battery. The magnet 74 is at a distal end of the removal device 70 to allow for convenient extension of the magnet 74 into the housing 20 and magnetic engagement of the battery by the metal terminal of the battery. The first terminal is comprised of either a positive terminal or a negative terminal of the first removable battery.

Figure 8:
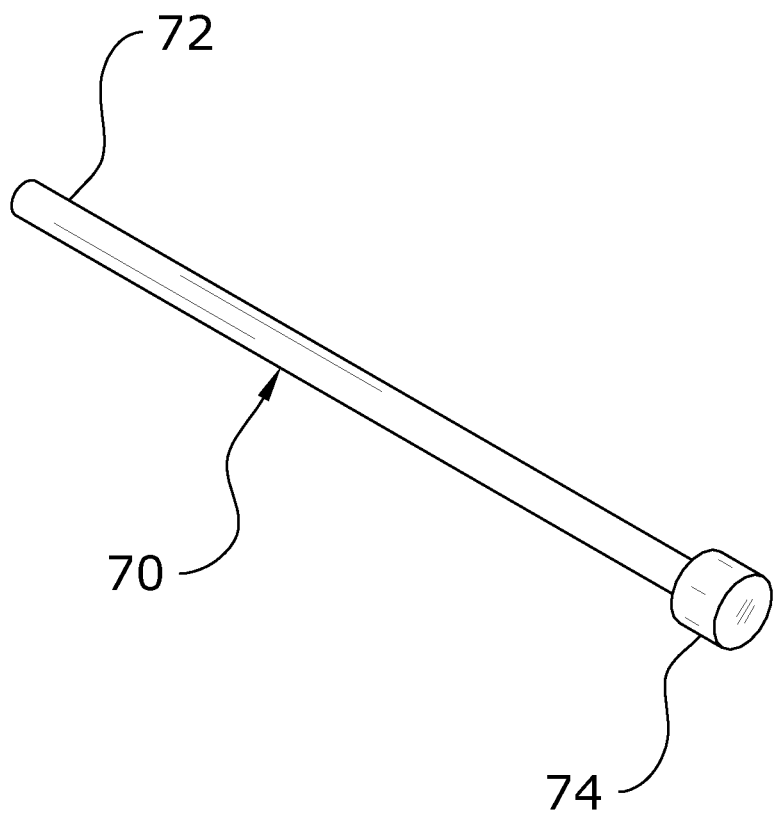
FIG. 8 is an upper perspective view of the removal device.
Figure 9:
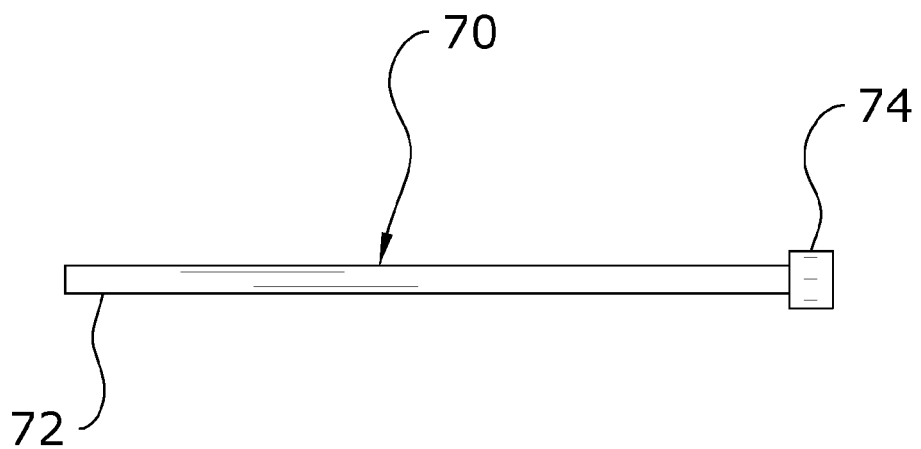
FIG. 9 is a side view of the removal device.

The removal device 70 includes a handle 72 with the magnet 74 concentrically attached to a distal end of the handle 72 as best illustrated in FIGS. 8 and 9 of the drawings. The handle 72 is comprised of an elongated structure and is comprised of a non-magnetic material. A length of the handle 72 is greater than a length of the magnet 74 and a width of the handle 72 is less than the magnet 74 in a preferred embodiment as shown in FIGS. 8 and 9. It can be appreciated that the handle 72 may have a length equal to or shorter than the magnet 74. In addition, the handle 72 may have a width equal to or greater than the width of the magnet 74.

E. Operation of Preferred Embodiment

In use, the user opens the door 30 and places the batteries 12, 14, 16, 18, 19 in their respective compartments 50, 52, 54, 56, 58 as illustrated in FIG. 6 of the drawings. Once the compartments 50, 52, 54, 56, 58 are filled, the user then closes the door 30 and secures the latch device 40 by extending the handle 72 of the removal device 70 through the latch aperture 46 within the extended member 44 that is received through a slit 42 within the latch device 40. The housing 20 may be transported in a portable manner or may be mounted to a wall or other structure. During removal of batteries, the housing 20 is preferably vertically orientated to allow for gravity to automatically lower the batteries 12, 14, 16, 18, 19.

Figure 7B:
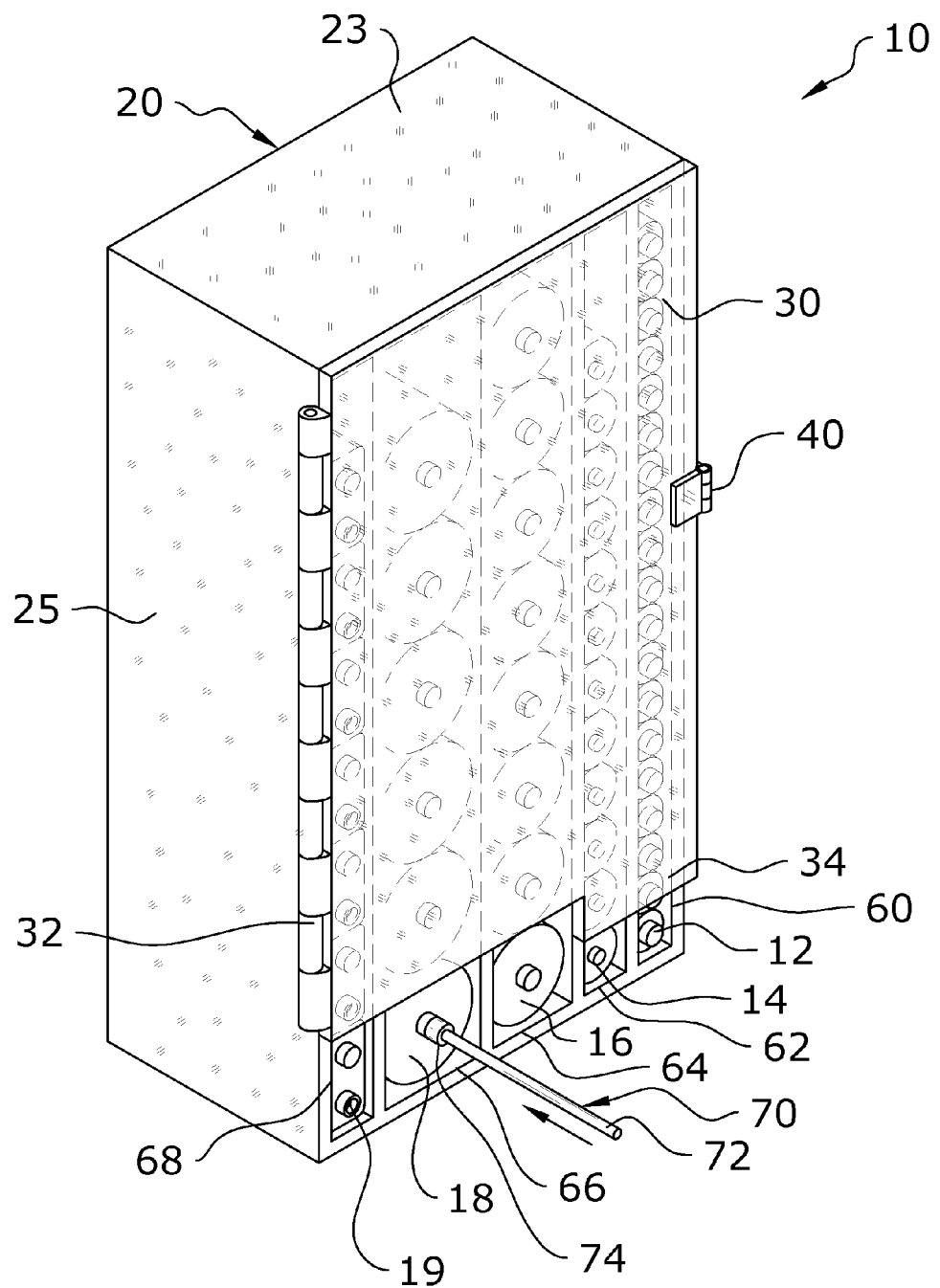
FIG. 7b is an upper perspective view of the present invention with the magnet of the removal device magnetically attached to the positive terminal of the D battery.
Figure 7C:
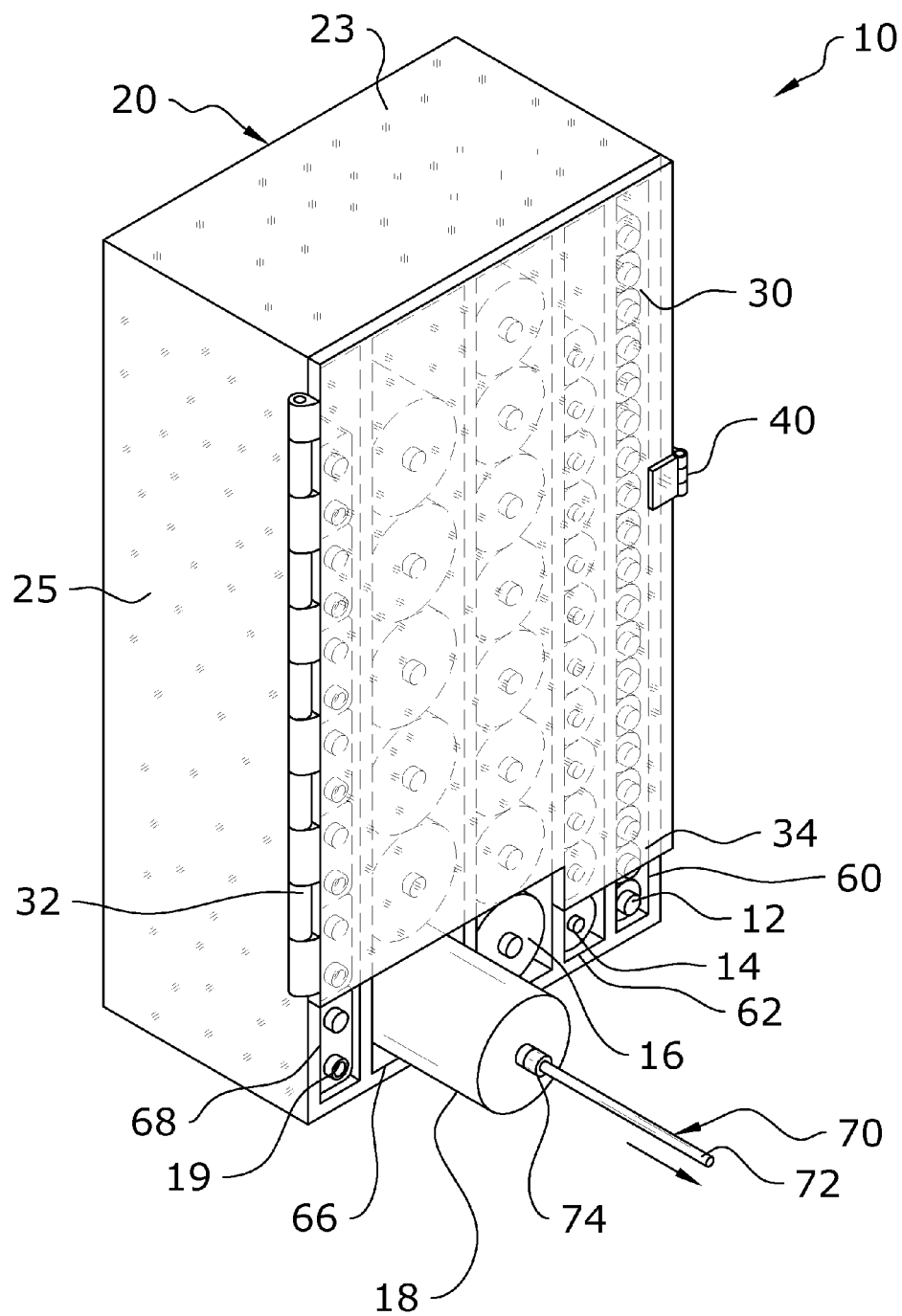
FIG. 7c is an upper perspective view of the present invention with the removal device partially removing the D battery.
Figure 7D:
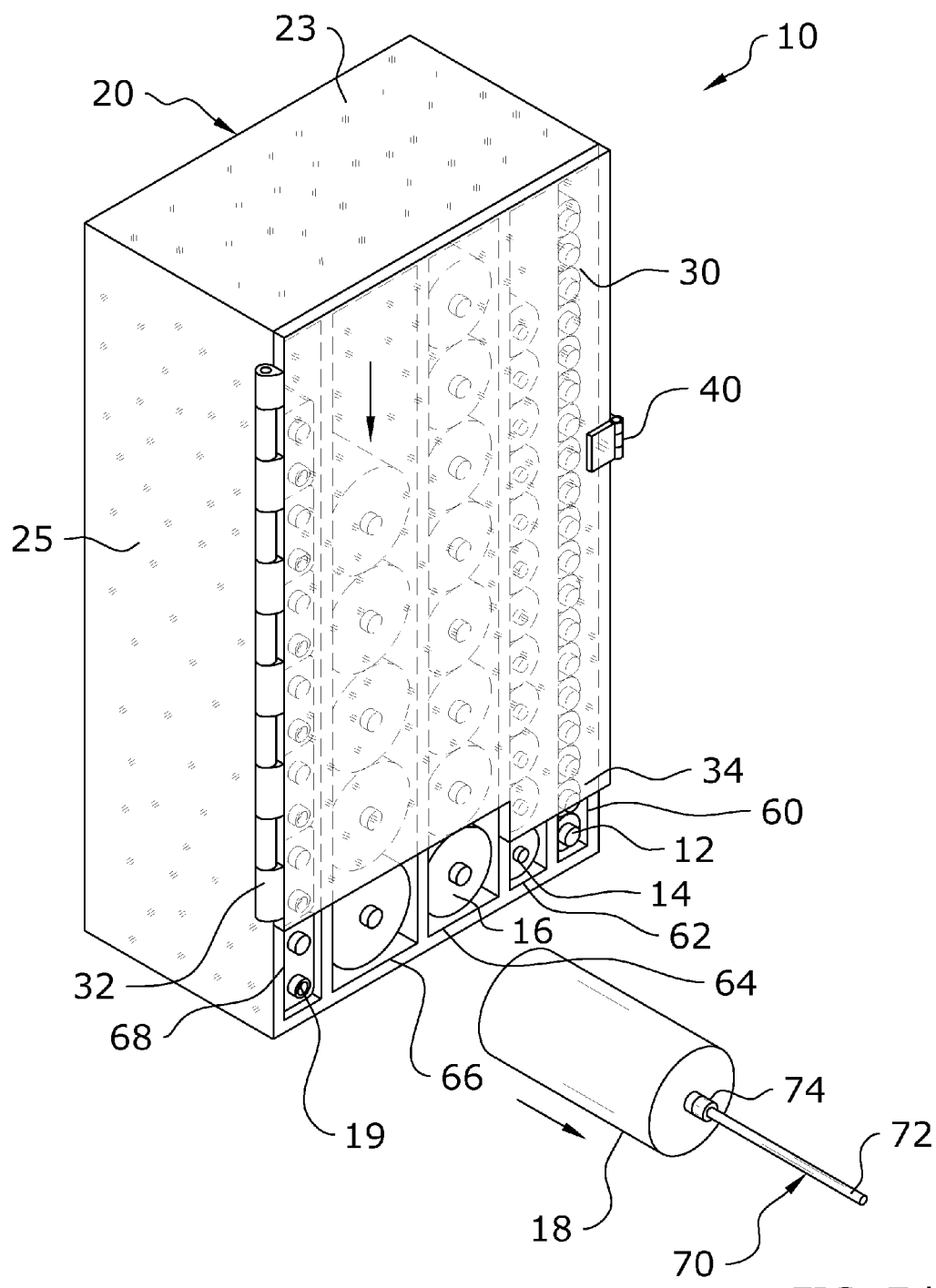
FIG. 7d is an upper perspective view of the present invention with the removal device fully removing the D battery from the housing.

When the user desires to retrieve a battery, the user identifies the type of battery they need (e.g. D battery 18) and then positions the removal device 70 so that the magnet 74 is near or engaging the metal terminal of the corresponding removable battery as shown in FIGS. 7a and 7b of the drawings. The magnet 74 of the removal device 70 magnetically attaches and connects to the terminal of the removable battery. The magnet 74 may extend through or is positioned adjacent to the opening 60, 62, 64, 66, 68 to access the corresponding battery within the housing 20. The user then pulls outwardly upon the handle 72 of the removal device 70 thereby correspondingly pulling the removable battery out through the opening 60, 62, 64, 66, 68 within the housing 20 as shown in FIGS. 7c and 7d of the drawings. The user continues to pull the removable battery outwardly until the removable battery is completely removed. After the removable batter is completely removed, the next battery in the stack of batteries in the corresponding compartment move downwardly so the user may repeat the process to remove a second or third battery. The user removes the removal device 70 from the removed battery and then inserts the battery into an electronic device of their choice (e.g. flashlight). If the user requires additional batteries, this process is repeated for the type of battery required. If the user does not require additional batteries, the user repositions the removal device 70 in the latch aperture 46 to retain the latch device 40 upon the extended member 44 and for storage of the removal device 70.

It is important to note that when additional batteries 12, 14, 16, 18, 19 are required to be added, they are added to the top of the stack of batteries 12, 14, 16, 18, 19 so that the older batteries are dispensed first through the bottom basically providing a first in, first out type of system. This allows the batteries 12, 14, 16, 18, 19 to be dispensed based on the expiration date to prevent batteries 12, 14, 16, 18, 19 from aging past their expiration date.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A battery storage and dispensing system, comprising:
    a housing having a first compartment, wherein said first compartment is adapted to receive and store a plurality of first batteries;
    a first opening within said housing exposing a first removable battery of said plurality of first batteries, wherein a first terminal of said first removable battery is exposed through said first opening;
    a removal device having a magnet, wherein said removal device includes a handle with said magnet attached to a distal end of said handle, wherein said magnet produces a magnetic field that attracts said at least one of said plurality of first batteries through said first opening when said magnet is positioned near said first opening to remove said battery;
    wherein said first compartment is vertically orientated so that said first removable battery is the lowermost of said plurality of first batteries;
    wherein when said first removable battery is removed from said housing, a first next battery automatically moves downwardly via gravity to be the lowermost of said plurality of first batteries;
    wherein said housing includes a second compartment adjacent to said first compartment, wherein said second compartment is vertically orientated and is adapted to receive and store a plurality of second batteries, wherein said plurality of second batteries are a different type of battery than said plurality of first batteries and wherein a width of said second compartment is different than a width of said first compartment;
    wherein said housing includes a third compartment adjacent to said second compartment, wherein said third compartment is vertically orientated and is adapted to receive and store a plurality of third batteries, wherein said plurality of third batteries are a different type of battery than said plurality of first batteries and said plurality of second batteries, and wherein a width of said third compartment is different than a width of said first compartment and said second compartment; and
    a door attached to said housing adapted to selectively enclose an upper portion of said first compartment, said second compartment and said third compartment, wherein said door forms said first opening.

2. The battery storage and dispensing system of claim 1, wherein said handle is comprised of an elongated structure.

3. The battery storage and dispensing system of claim 2, wherein a length of said handle is greater than a length of said magnet and wherein a width of said handle is less than said magnet.

4. The battery storage and dispensing system of claim 2, wherein said magnet is concentrically attached to said handle.

5. The battery storage and dispensing system of claim 1, wherein said handle is comprised of a non-magnetic material.

6. The battery storage and dispensing system of claim 1, wherein said magnet is comprised of a permanent magnet.

7. The battery storage and dispensing system of claim 1, wherein said first terminal is comprised of either a positive terminal or a negative terminal of said first removable battery.

8. The battery storage and dispensing system of claim 1, wherein said plurality of first batteries, said plurality of second batteries and said plurality of third batteries are comprised of conventional consumer batteries.

9. The battery storage and dispensing system of claim 1, wherein said first compartment has a width greater than 10.5 mm and a depth greater than 44.5 mm.

10. The battery storage and dispensing system of claim 1, wherein said door is pivotally attached to said housing and includes a latch device attached to a distal portion of said door that removably connects to an extended member, wherein said extended member extends outwardly from said housing.

11. The battery storage and dispensing system of claim 10, wherein said extended member includes a latch aperture that is adapted to receive said removal device to secure said latch device to said extended member and to store said removal device during non-usage.

12. The battery storage and dispensing system of claim 1, wherein said plurality of first batteries are comprised of an elongated structure.

13. A method of removing a battery from a battery storage apparatus, said method comprising the steps of:
    providing a battery storage apparatus comprising:
        a housing having a first compartment, wherein said first compartment is adapted to receive and store a plurality of first batteries; and
        a first opening within said housing exposing a first removable battery of said plurality of first batteries, wherein a first terminal of said first removable battery is exposed through said first opening;
    providing a removal device having a magnet;
    positioning said removal device so that said magnet is near or engaging said first terminal of said first removable battery;
    attaching said magnet of said removal device magnetically to said first terminal of said first removable battery; and pulling upon said removal device until said first removable battery is removed from said housing through said first opening.

14. A battery storage and dispensing system, comprising:

a housing having a first sidewall, a second sidewall opposite of said first sidewall, a rear wall attached to said first sidewall and said second sidewall, a first end wall attached to an upper end of said first sidewall and said second sidewall, and a second end wall attached to a lower end of said first sidewall and said second sidewall opposite of said first end wall;

a door pivotally attached to said housing adapted to selectively enclose an upper portion of said first compartment, wherein said door is positioned opposite of said rear wall and wherein said door is vertically orientated, said second compartment and said third compartment, wherein said door forms a lower opening between a lower edge of said door and said second end wall;

wherein said housing includes a first compartment, wherein said first compartment is adapted to receive and store a plurality of first batteries, wherein said first compartment is vertically orientated so that a first removable battery is the lowermost of said plurality of first batteries, wherein a first terminal of said first removable battery is exposed through said lower opening, and wherein when said first removable battery is removed from said housing, a first next battery automatically moves downwardly via gravity to be the lowermost of said plurality of first batteries;

wherein said housing includes a second compartment, wherein said second compartment is adapted to receive and store a plurality of second batteries, wherein said second compartment is vertically orientated so that a second removable battery is the lowermost of said plurality of second batteries, wherein a second terminal of said second removable battery is exposed through said lower opening, and wherein when said second removable battery is removed from said housing, a second next battery automatically moves downwardly via gravity to be the lowermost of said plurality of second batteries;

wherein said housing includes a third compartment, wherein said third compartment is adapted to receive and store a plurality of third batteries, wherein said third compartment is vertically orientated so that a third removable battery is the lowermost of said plurality of third batteries, wherein a third terminal of said third removable battery is exposed through said lower opening, and wherein when said third removable battery is removed from said housing, a third next battery automatically moves downwardly via gravity to be the lowermost of said plurality of third batteries;

wherein said plurality of first batteries, said plurality of second batteries and said plurality of third batteries are comprised of an elongated structure; and a removal device having a magnet, wherein said removal device includes a handle with said magnet attached to a distal end of said handle, wherein said magnet produces a magnetic field that attracts one of said first removable battery, said second removable battery or said third removable battery through said lower opening when said magnet is positioned near said lower opening to remove said battery.

15. The battery storage and dispensing system of claim 14, wherein said handle is comprised of an elongated structure.

16. The battery storage and dispensing system of claim 14, wherein said magnet is concentrically attached to said handle.

17. The battery storage and dispensing system of claim 14, wherein said first terminal is comprised of either a positive terminal or a negative terminal of said first removable battery.

18. The battery storage and dispensing system of claim 14, wherein said plurality of first batteries, said plurality of second batteries and said plurality of third batteries are comprised of conventional consumer batteries.

19. The battery storage and dispensing system of claim 14, wherein said door is pivotally attached to said housing and includes a latch device attached to a distal portion of said door that removably connects to an extended member, wherein said extended member extends outwardly from said housing.

20. The battery storage and dispensing system of claim 19, wherein said extended member includes a latch aperture that is adapted to receive said removal device to secure said latch device to said extended member and to store said removal device during non-usage.

* * * * *